United States Patent [19]
Simioni et al.

[11] Patent Number: 5,898,471
[45] Date of Patent: Apr. 27, 1999

[54] HINGE FOR EYEGLASSES

[75] Inventors: Luciano Simioni; Sergio Menegon, both of Montebelluna, Italy

[73] Assignee: Killer Loop S.p.A., Pederobba, Italy

[21] Appl. No.: 08/753,056

[22] Filed: Nov. 19, 1996

[30] Foreign Application Priority Data

Nov. 22, 1995 [IT] Italy ................................ TV95A0142

[51] Int. Cl.⁶ .................................................. G02C 5/22
[52] U.S. Cl. ............................................ 351/153; 16/228
[58] Field of Search .................................. 351/113, 119, 351/121, 153; 16/228

[56] References Cited

U.S. PATENT DOCUMENTS

| 2,210,507 | 8/1940 | Spill ......................................... 351/153 |
| 2,947,024 | 8/1960 | Czudak, Jr. ............................... 351/153 |
| 4,153,347 | 5/1979 | Myer ....................................... 351/153 |
| 4,526,448 | 7/1985 | Hanson .................................... 351/153 |
| 4,978,209 | 12/1990 | Ohba ....................................... 351/153 |

FOREIGN PATENT DOCUMENTS

| 0495767 | 7/1992 | European Pat. Off. . |
| 1014634 | 9/1952 | France . |
| 4306502 | 9/1994 | Germany . |
| 734208 | 7/1955 | United Kingdom . |
| WO 94/20877 | 9/1994 | WIPO ................................ 351/153 |
| WO 94/29763 | 12/1994 | WIPO ................................ 351/153 |

*Primary Examiner*—Huy Mai
*Attorney, Agent, or Firm*—Katherine McGuire; Mary Anne Magee; Guido Modiano

[57] ABSTRACT

A hinge, particularly for rotatably coupling two parts of a pair of eyeglasses preferably made of plastics. The hinge is constituted by at least one first element, which merely allows the mutual positioning of the two components, and by at least one separate second element, which allows the mutual and temporary rotary coupling of the two parts.

40 Claims, 9 Drawing Sheets

HINGE FOR EYEGLASSES

BACKGROUND OF THE INVENTION

The present invention relates to a hinge, particularly for rotatably coupling two components of a pair of eyeglasses preferably made of plastics.

Eyeglasses are currently known in which the temples, made for example of metal or acetate, are associated with the front, which is made of the same materials, by interposing a metallic hinge that is constituted by a first element, such as a perforated lug that is partially embedded in the front, and by a second element, constituted by two perforated shoulders that protrude from the tip of the temple; the first and the second elements are associated one another by a pivot.

The insertion of the pivot therefore allows to achieve both the positioning and the rotary coupling between the temple and the front.

However, these conventional hinges are not free from drawbacks: the pivot must have minimal tolerances to ensure the precise coupling between the temple and the front, and said tolerances, in view of the extremely small size of the pivot, require expensive precision machining operations; moreover, a certain time is required to assemble the hinge to the components of the eyeglasses, and this entails an increase in the production cost.

Another conventional solution entails, if the front and the temples are made of plastics, a direct coupling between the front and the temple of a pair of eyeglasses without using an interposed coupling hinge; said coupling is provided by means of two L-shaped flaps that are arranged in a mirror-symmetrical fashion with respect to a median plane lying longitudinally to said temple and protrude longitudinally and perimetrically from the tip of the temple.

Said two flaps can be arranged at two seats formed proximate to the lateral end of the front that can be arranged adjacent to the temple.

However, this conventional solution, too, has drawbacks: the center distance between the two seats formed on the front can be different from the one calculated for optimum coupling in relation to the center distance of the two flaps, thus entailing difficulty in coupling the temple to the front.

This requires the mutual positioning of the flaps and of the seats to be calculated with a certain precision: an excessive center distance could in fact lead to difficulty in mutually coupling the front and the temple, causing easy breakage of the two parts during assembly or during replacement of one of them, whereas an insufficient center distance would lead to easy disengagement between the temple and the front; the smaller the center distance, the easier this can be achieved.

Regardless of the above-mentioned drawbacks, the direct mutual coupling of the front and the temple, without using a hinge, occurs by elastic deformation of the end of the temples that is associable with the front; this entails that an excessive pressure applied at said end facilitates the breakage of the temples or of the flaps associated therewith during coupling to the front.

The difficulty in achieving optimum mutual pivoting of the temple and of the front in the above described solution is increased by the fact that the two seats for the two flaps must be formed on the front by using an insert in the mold provided with two undercuts.

SUMMARY OF THE INVENTION

The aim of the present invention is therefore to solve the described problems, eliminating the drawbacks of the cited prior art, by providing a hinge that allows to achieve rotary coupling between two parts of a pair of eyeglasses, said coupling being obtainable in an optimum manner with good precision in the placement of the two components and in their rotatable fixing.

Within the scope of this aim, an important object is to provide a hinge having considerable impact resistance.

Another object is to provide a hinge that allows to assemble and disassemble the parts of the pair of eyeglasses simply and rapidly, allowing to perform these operations repetitively without affecting the integrity of the components of the pair of eyeglasses.

Another object is to provide a hinge that has a low cost and can be produced with conventional machines and equipment.

This aim, these objects, and others that will become apparent hereinafter are achieved by a hinge, particularly for rotatably coupling two parts of a pair of eyeglasses, characterized in that it is constituted by at least one first element that merely allows the mutual positioning of said two components and by at least one separate second element that allows the mutual and temporary rotary coupling of said two parts.

BRIEF DESCRIPTION OF THE DRAWINGS

Further characteristics and advantages of the invention will become apparent from the following detailed description of some particular embodiments thereof, illustrated only by way of non-limitative example in the accompanying drawings, wherein:

FIG. 6 is a view, similar to FIG. 4, of the second embodiment of the hinge;

FIGS. 7 and 8 are views, similar to those of FIGS. 5 and 6 respectively, of a third embodiment of the hinge;

FIGS. 9 and 10 are views, similar to those of FIGS. 5 and 6 respectively, of a fourth embodiment of the hinge;

FIGS. 11 and 12 are views, similar to those of FIGS. 5 and 6 respectively, of a fifth embodiment of the hinge;

FIGS. 13 and 14 are views, similar to those of FIGS. 5 and 6 respectively, of a sixth embodiment of the hinge;

FIGS. 15 and 16 are views, similar to those of FIGS. 5 and 6 respectively, of a seventh embodiment of the hinge;

FIGS. 17 and 18 are views, similar to those of FIGS. 5 and 6 respectively, of an eighth embodiment of the hinge;

DESCRIPTION OF THE PREFERRED EMBODIMENTS

With reference to the above figures, the reference numeral 1 designates a first part of a pair of eyeglasses; in the particular embodiment illustrated, said part is a temple, which has a for example rectangular shape in plan view, is preferably made of plastics, and can be coupled to a second part, such as a front, designated by the reference numeral 2.

The temple 1 has a first end 3 that can be arranged adjacent to the front 2 at a second lateral end 8 thereof.

A first upper flap 4a and a second lower flap 4b protrude at right angles to the first end 3; said flaps are mutually identical and are arranged on planes that are parallel to each other and to a plane that passes through the upper surface 50 of the temple 1; said first and second flaps 4a and 4b are approximately as wide as said temple 1 is thick.

A first element 5a protrudes from the free end of the first upper flap 4a, at right angles to, and away from, the second lower flap 4b, and is preferably constituted by a cylindrical pin having a chamfered upper end.

A second flexible element 5b protrudes from the second lower flap 4b towards the first flap 4a and along the same axis as the first element 5a.

The second element 5b is constituted by a cylindrical stem 6a the diameter whereof is approximately equal to the diameter of the first element 5a; a frustum-shaped head 6b is associated, in an upward region, with the stem 6a and has a base diameter that is greater than the diameter of the stem 6a, thus protruding perimetrically from said stem.

Said second element 5b has a first diametrical recess 7 the length whereof is such as to allow the elastic deformation of said second element 5b, so as to temporarily reduce the base dimensions of said element.

The second end 8 of the front 2 has a first hollow 9a and a second hollow 9b that are mutually identical, are essentially shaped like a parallelepiped, and are formed adjacent to each other starting from the inner lateral surface of the front 2.

The first hollow 9a and the second hollow 9b have such dimensions as to allow the insertion of the first and second elements 5a and 5b, which are associated respectively with the first flap 4a and with the second flap 4b; a base 10 is formed between the first hollow 9a and the second hollow 9b, and the height of said base is greater than the distance between the second element 5b and the first flap 4a and is approximately equal to the height of the stem 6a of the second element 5b.

The second end 8 also has a hole 11 which, starting from the lower perimetric edge 12 of the front 2, and by passing through the first hollow 9a and the second hollow 9b and the base 10 along an axis that is approximately parallel to the axis of the first and second elements 5a and 5b, affects part of the thickness of the upper perimetric edge 13 of said front 2.

Said hole 11, the diameter whereof is equal to the diameter of the first element 5a and of the stem 6a, forms a first seat 14a, which is shaped complementarily with respect to the first element 5a and is located proximate to the upper perimetric edge 13, a second cylindrical seat 14b at the base 10, and a second recess 15 at the lower perimetric edge 12.

Operation is as follows: the first end 3 of the temple 1 is placed adjacent to the second end 8 of the front 2, inserting the first and second flaps 4a and 4b at the first and second hollows 9a and 9b, so that the first flap 4a rests above the base 10; the first element 5a is thus positioned at the first seat 14a, thus determining the mutual positioning of the temple 1 and of the front 2; simultaneously, the second element 5b is inserted in the second seat 14b with a snap action and the second element 5b is positioned so that the outer perimetric edge of the head 6b abuts against the upper surface of the base 10 in order to allow rotation of the temple but not its disengagement from the front unless it is forced by means of an adapted tool.

It has been observed that the hinge thus conceived has achieved the intended aim and objects, since the first element allows only mutual positioning of the two parts of the pair of eyeglasses, which are constituted by a temple and a front in the particular embodiment, and the second element allows the mutual and temporary rotary coupling of said two parts; said hinge furthermore has considerable impact resistance and is easy to assemble and disassemble; moreover, disassembly can be performed by means of an appropriate tool that allows to deform the head 6b, disengaging the second element from the second seat and thus disengaging the temple from the front.

The coupling between the parts can be achieved in an optimum manner with extreme precision in the positioning of the two parts and in their fixing.

Furthermore, the elastic deformations affecting the hinge during coupling and uncoupling are very limited, considerably reducing the possibilities of breakage occurring because the elasticity limit is exceeded.

By acting like a spring, the second element 5b furthermore allows to eliminate any plays, thus ensuring correct friction against the base 10 during mutual rotation.

The invention is of course susceptible of numerous modifications and variations, all of which are within the scope of the same inventive concept.

Thus, for example, in an equivalent manner, if the pair of eyeglasses includes a temple constituted by a first and a second pieces, said pieces can be likened to the first and second parts and therefore be associated by interposing a hinge according to the invention.

Likewise, if the front of a pair of eyeglasses is constituted by two mutually identical parts, they can be associated by interposing a hinge according to the invention, which must be symmetrical with respect to a median plane that lies transversely to the pair of eyeglasses.

Figure 1:
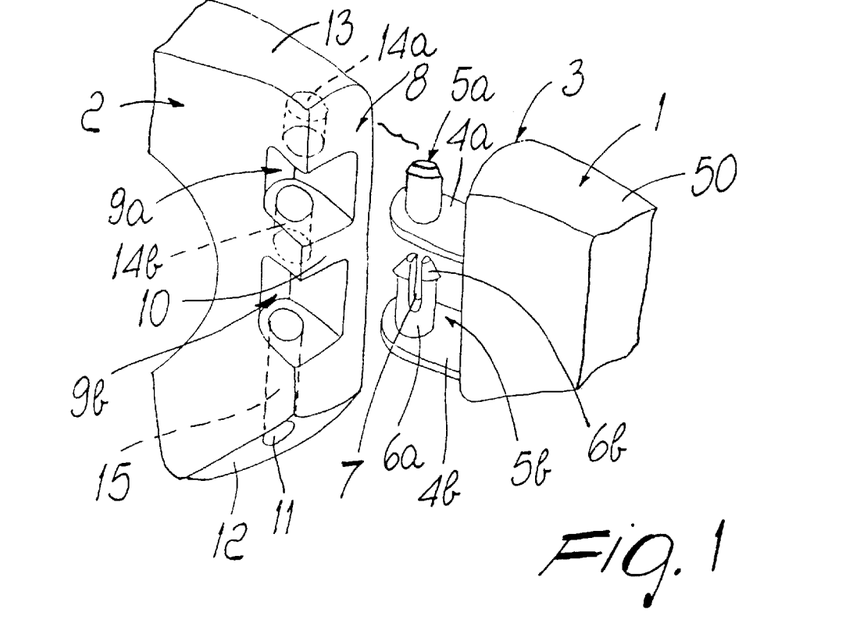
FIG. 1 is a perspective view of a hinge associated with two parts of a pair of eyeglasses.
Figure 2:
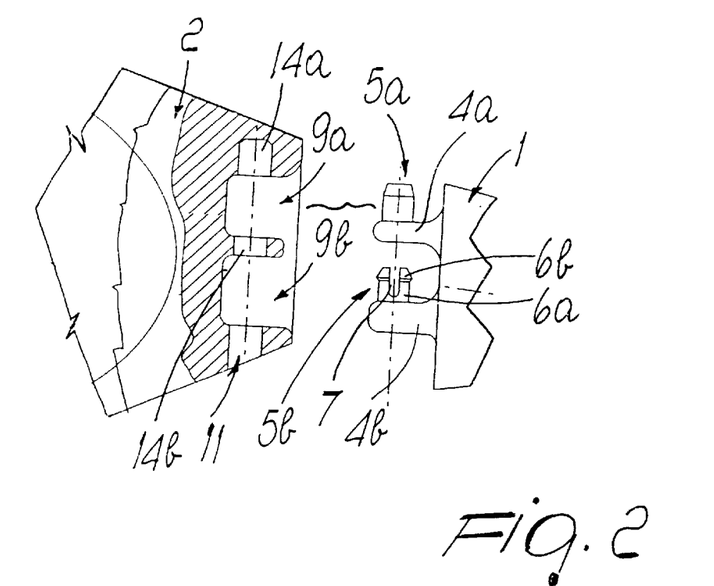
FIG. 2 is a sectional side view of the pair of eyeglasses at the hinge.
Figure 3:
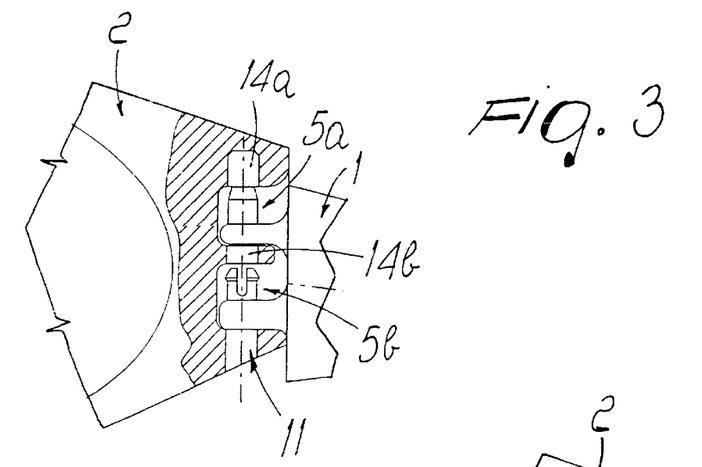
FIG. 3 is a view, similar to FIG. 2, of the hinge during coupling.
Figure 4:
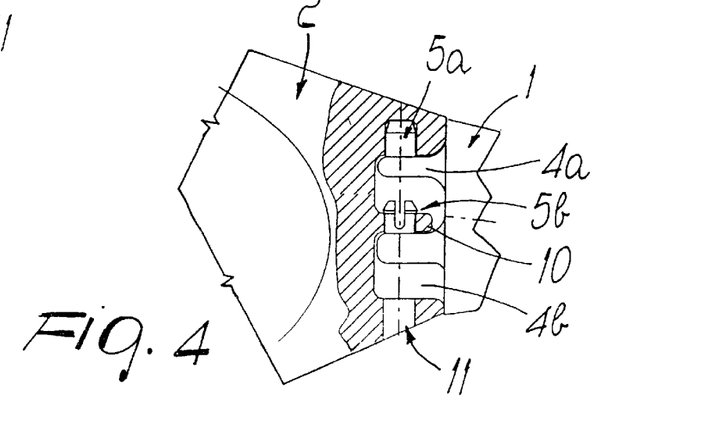
FIG. 4 is a view, similar to FIG. 2, of the two parts of the pair of eyeglasses after mutual coupling.
Figure 5:
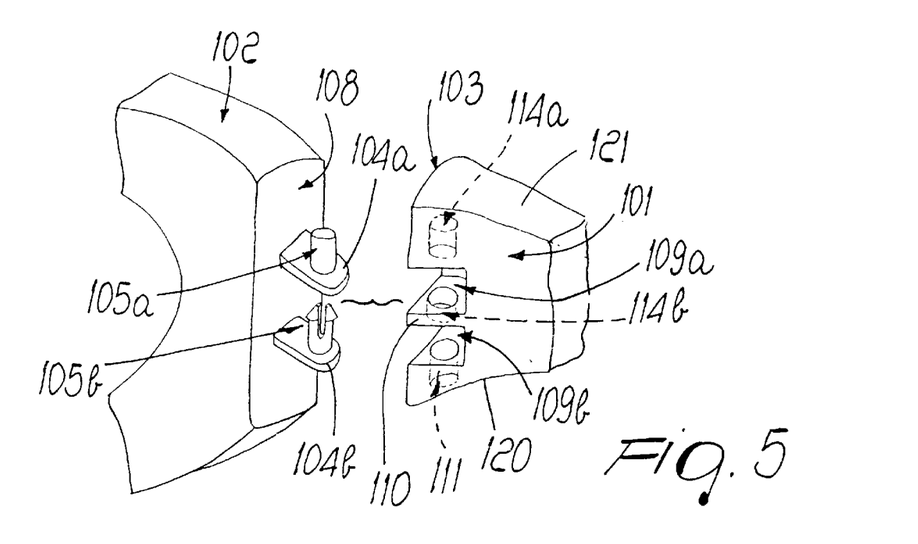
FIG. 5 is a perspective view, similar to FIG. 1, of a second embodiment of the hinge.
Figures 6, 7:
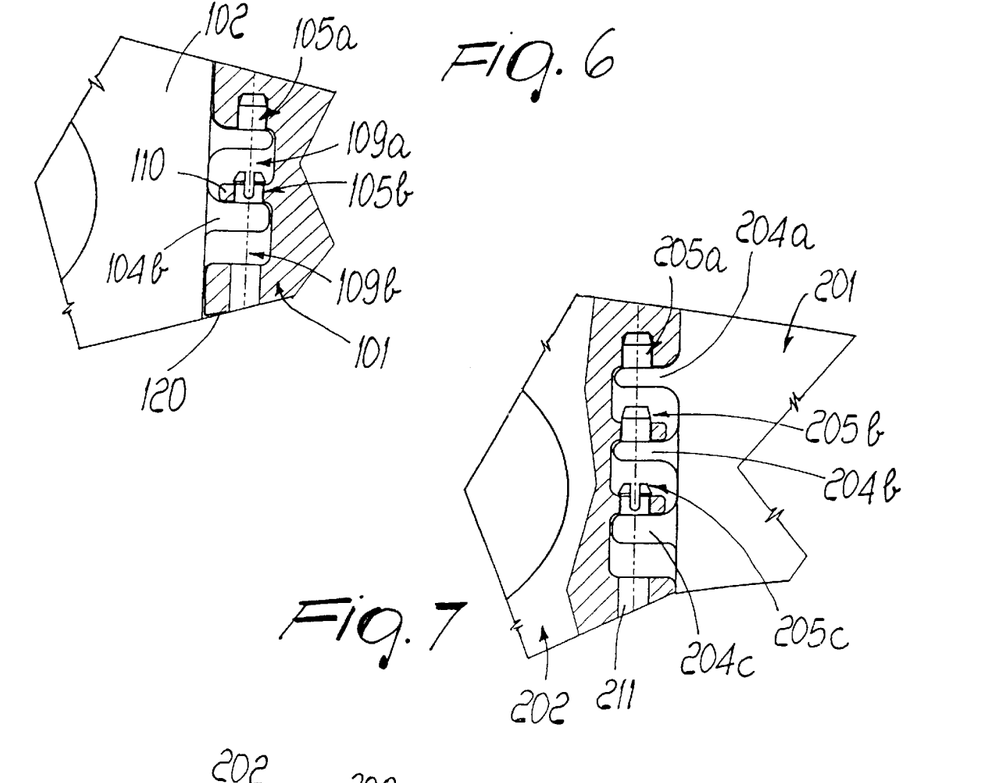

FIGS. 5 and 6 illustrate a second embodiment of a hinge for rotatably coupling a first end 103 of a temple 101 and a second lateral end 108 of a front 102.

A first flap 104a and a second flap 104b protrude, on mutually parallel planes, at right angles to the second end 108; a first element 105a and a second element 105b respectively protrude at right angles to said first and second flaps 104a and 104b along the same axis and above said flaps.

The first element 105a, which is constituted by a pivot, and the second element 105b, which is flexible and mushroom-shaped, can be inserted at a first hollow 109a and at a second hollow 109b that are formed in the first end 103 starting from the inner lateral surface of the temple 101.

A base 110 is formed between the first hollow 109a and the second hollow 109b.

The temple 101 furthermore has a first seat 114a and a second seat 114b that are formed by a single hole 111 which, starting from the lower perimetric edge 120 of the temple 101, affects the first and second hollows 109a and 109b, the base 110, and part of the thickness of the upper perimetric edge 121.

By placing the first end 103 adjacent to the second end 108 and by inserting the first element 105a in the first seat 114a, it is possible to mutually position the front 102 and the temple 101 quickly and simply, whereas the simultaneous snap insertion of the second element 105b in the second seat 114b allows the temple 101 to rotate but not to disengage from the front 102.

This solution, too, allows to achieve the intended aim and objects.

Figure 8:
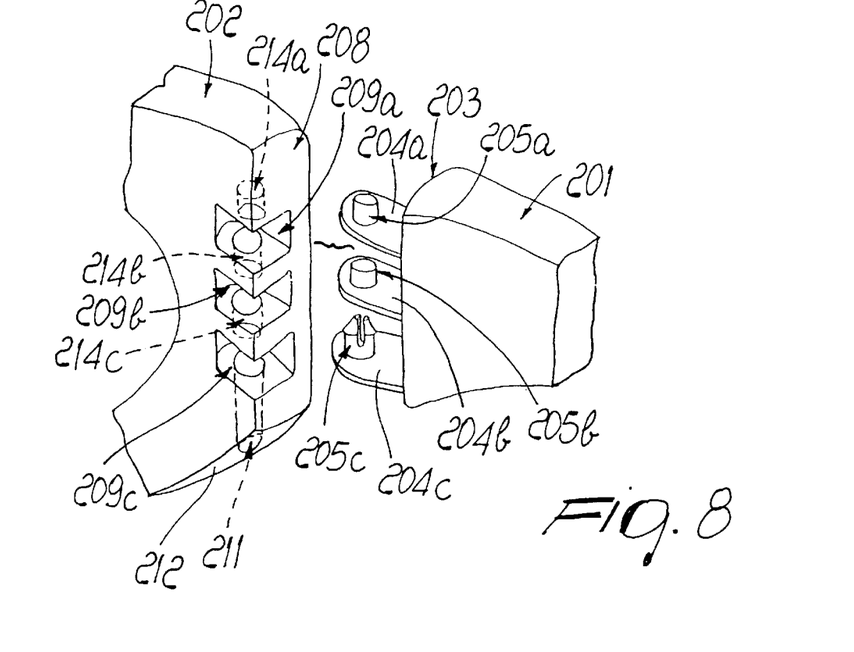

FIGS. 7 and 8 illustrate a third embodiment of a hinge for rotatably coupling a first end 203 of a temple 201 and a second lateral end 208 of a front 202.

This solution provides for two first elements 205a and 205b, which protrude from two first flaps 204a and 204b associated at right angles with the first end 203 of the temple 201, and for a second element 205c that protrudes at right angles, and along the same axis as the two first elements 205a and 205b, from a third flap 204c arranged below the two first flaps 204a and 204b.

The second end 208 has three hollows 209a, 209b, and 209c that are mutually identical and have such dimensions as to allow the insertion of the two first elements 205a nd 205b and of the second element 205c that are associated with the two first flaps 204a and 204b and with the second flap 204c.

By means of a single hole 211, starting from the lower perimetric edge 212 of the front 202 and with an axis that is approximately parallel to the axis of the two first elements 205a and 205b, there are provided two first seats 214a and 214b, which are shaped complementarily to the two first elements 205a and 205b, and a second seat 214c, which allows the snap insertion of the second element 205c.

By arranging the first end 203 adjacent to the second end 208, the insertion of the two first elements 205a and 205b in the two first seats 214a and 214b allows to mutually position the front 202 and the temple 201, whereas the simultaneous snap insertion of the second element 205b in the second seat 214c allows the temple 201 to rotate but not to disengage from the front 202.

This solution, too, allows to achieve the intended aim and objects.

Figure 9:
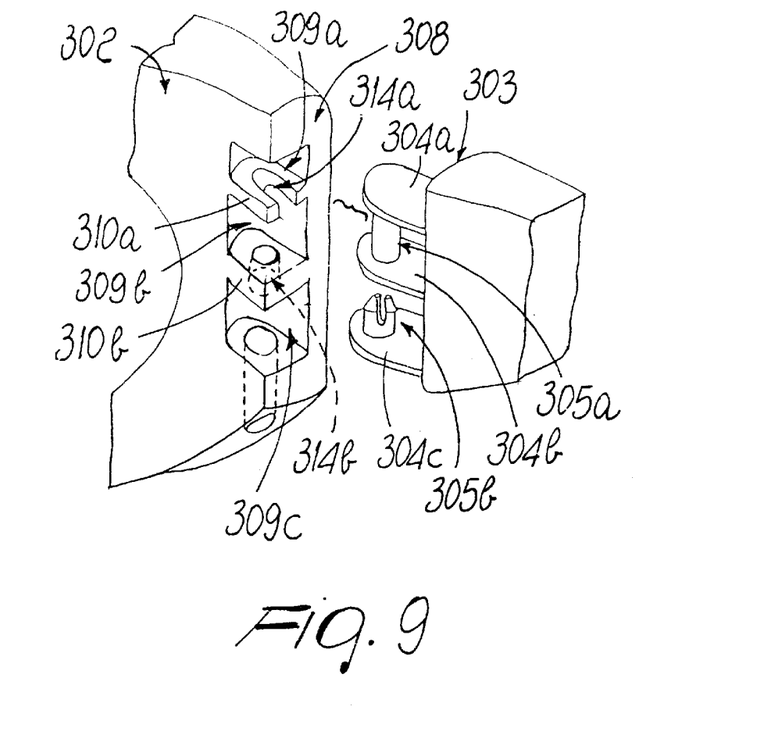
Figure 10:
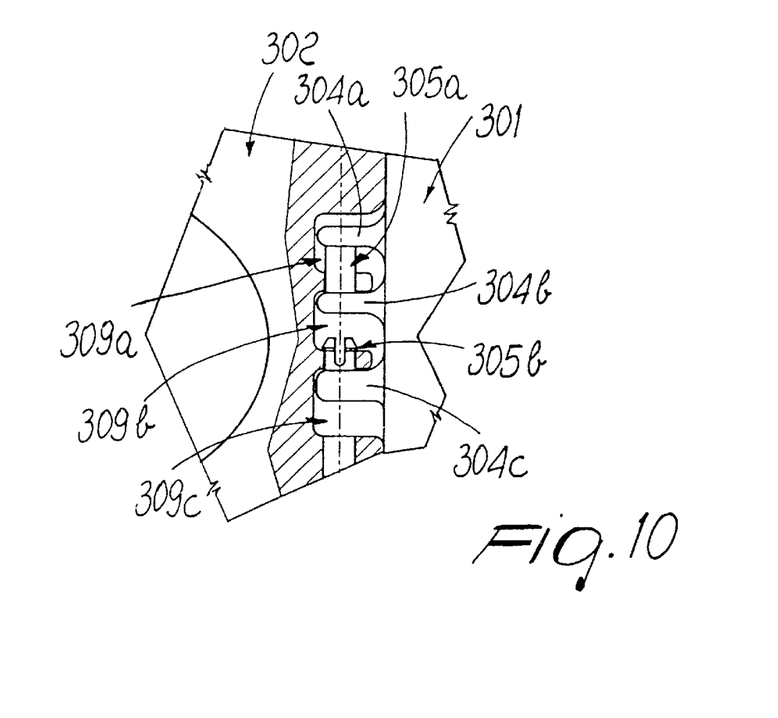

FIGS. 9 and 10 illustrate a fourth embodiment of a hinge for rotatably coupling a first end 303 of a temple 301 and a second lateral end 308 of a front 302.

This solution provides for a first element 305a, which is constituted by a cylindrical pivot interposed between two first flaps 304a and 304b that protrude at right angles from the first end 303 of the temple 301, and for a second element 305b, which protrudes from the first end 303 at right angles to a second flap 304c arranged below the two first flaps 304a and 304b and parallel thereto.

Three hollows 309a, 309b, and 309c are formed at the second end 308 of the front 302, and a first upper base 310a and a second lower base 310b are formed between said hollows.

A first seat 314a is formed at the first upper base 310a and is constituted by a recess which, starting from the free end, is arranged along the longitudinal median axis; said first seat 314a is adapted to contain the first element 305a, since its width is equal to the outside diameter of the pivot.

The second element 305b can be inserted with a snap action at a second seat 314b formed on the second lower base 310b along an axis that is approximately parallel to the axis of said second element 305b.

By arranging the first end 303 adjacent to the second end 308 and by inserting the first element 305a in the first seat 314a, the front 302 and the temple 301 are mutually positioned, whereas by simultaneously inserting, with a snap action, the second element 305b in the second seat 314b the rotation of the temple 301 is allowed but its uncoupling from the front 302 is not.

This solution, too, allows to achieve the intended aim and objects.

Figure 11:
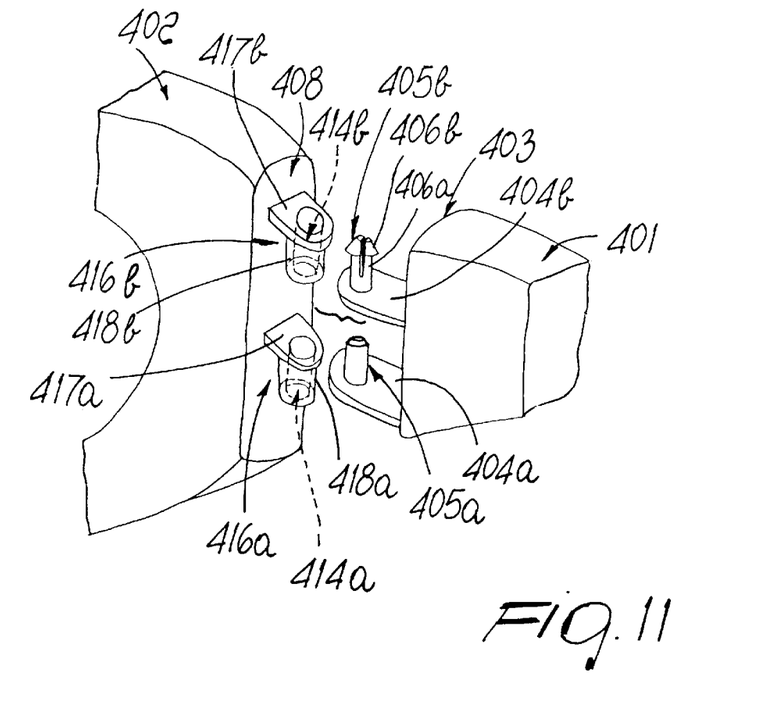
Figure 12:
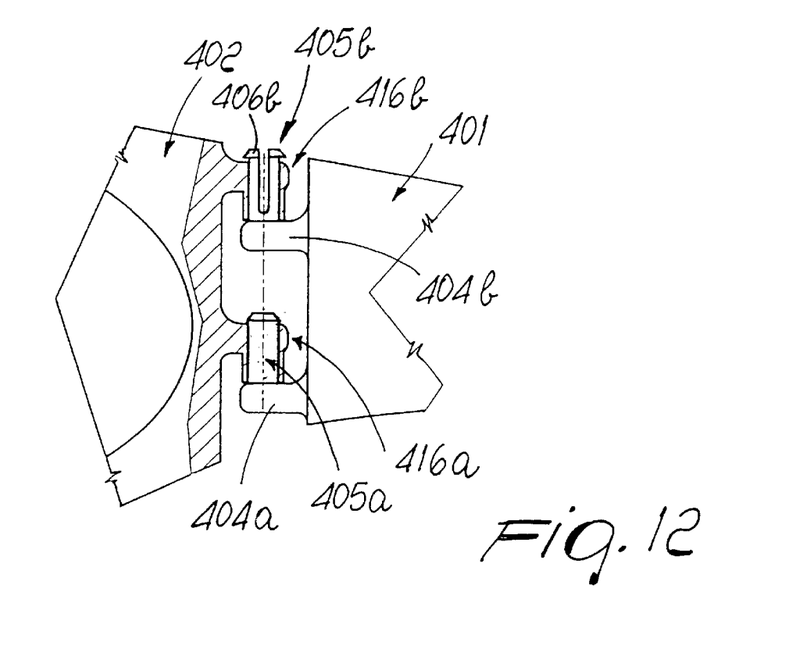

FIGS. 11 and 12 illustrate a fifth embodiment of a hinge for rotatably coupling a first end 403 of a temple 401 and a second lateral end 408 of a front 402.

This solution provides for a first element 405a that protrudes at right angles and upwardly from a first flap 404a that is associated at right angles to the first end 403.

A second flap 404b is arranged at right angles to the first end 403 and above the first flap 404a, and a second mushroom-shaped element 405b protrudes from said flap 404b; said mushroom-shaped element is constituted by a stem 406a associated with a head 406b that protrudes perimetrically from said stem 406a and has a diametrical recess that allows its elastic deformation.

A first tab 416a and a second tab 416b protrude at right angles from the second end 408; both tabs are L-shaped and are constituted by a third flap 417a and by a fourth flap 417b that are associated at right angles to the second end 408; a first hollow cylinder 418a and a second hollow cylinder 418b protrude downwardly from said third and fourth flaps along a same axis that is perpendicular thereto; said cylinders are adapted to internally form a first seat 414a and a second seat 414b that are shaped complementarily with respect to the first element 405a and to the stem 406 of the second element 405b.

By placing the first end 403 adjacent to the second end 408 and by inserting the first element 405a in the first seat 414a, the front 402 and the temple 401 can be mutually positioned, whereas by means of the simultaneous snap insertion of the second element 405b in the second seat 414b and through the protrusion of the head 406b above said second seat 414b, the temple 401 is allowed to rotate but not to disengage from the front 402.

This solution, too, allows to achieve the intended aim and objects.

Figure 13:
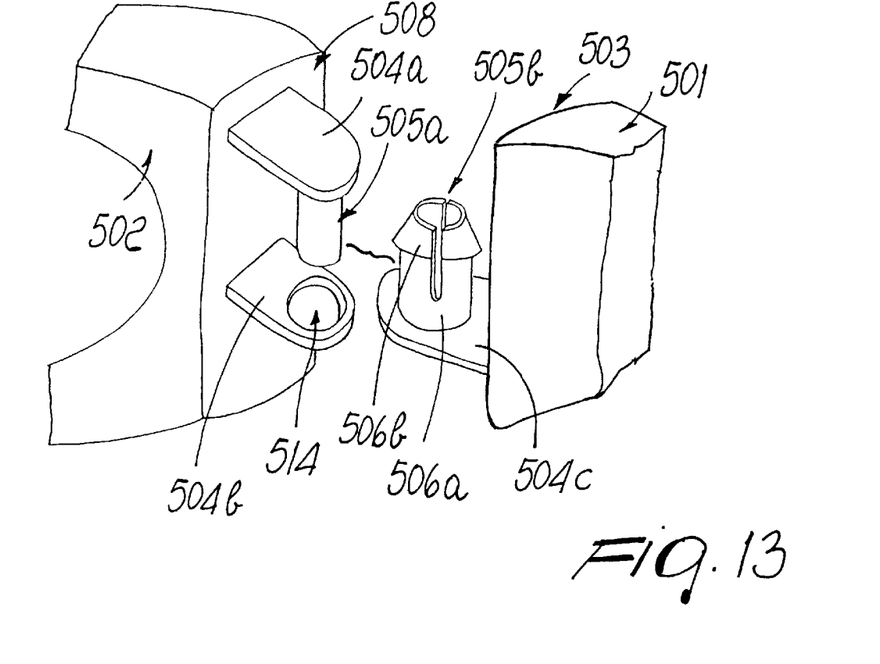
Figure 14:
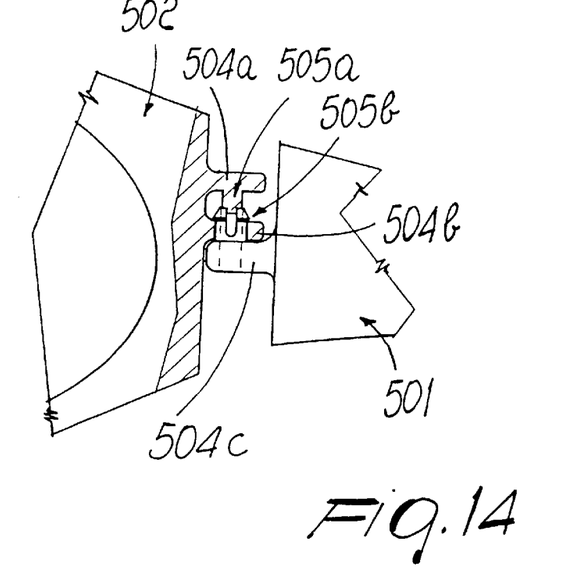

FIGS. 13 and 14 illustrate a sixth embodiment of a hinge for rotatably coupling a first end 503 of a temple 501 and a second lateral end 508 of a front 502.

Two first flaps 504a and 504b protrude at right angles to the second end 508 and are arranged on parallel planes; a first element 505a protrudes from the upper flap in a downward direction and along a perpendicular axis and is shorter than the center distance between said two first flaps 504a and 504b.

The lower flap of the two first flaps 504a and 504b has a first seat 514 that is formed by a hole having the same axis as the first element 505a.

A second flap 504c protrudes at right angles to the first end 503, and a second element 505b is associated with said second flap in an upper region and along a perpendicular axis.

Said second element 505b is constituted by a cylindrical hollow stem 506a the diameter whereof is approximately equal to the diameter of the first seat 514; said stem is associated with a frustum-shaped hollow head 506b the base diameter whereof is greater than the outside diameter of the stem 506a.

By placing the first end 503 adjacent to the second end 508 and by inserting the second element 505b in the first seat 514, and by partially inserting the free end of the first element 505a in the cavity of the second element 505b at the head 506b, the front 502 and the temple 501 are mutually positioned, whereas by means of the simultaneous snap insertion of the second element 505b in the first seat 514 the temple 501 is allowed to rotate but not to disengage from the front 502.

his solution, too, allows to achieve the intended aim and objects.

Figure 15:
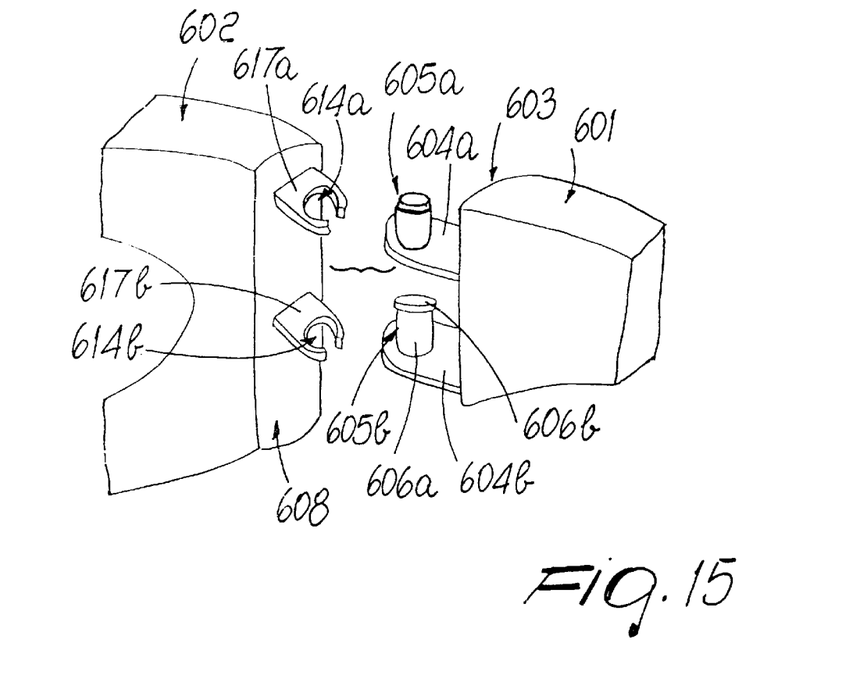
Figure 16:
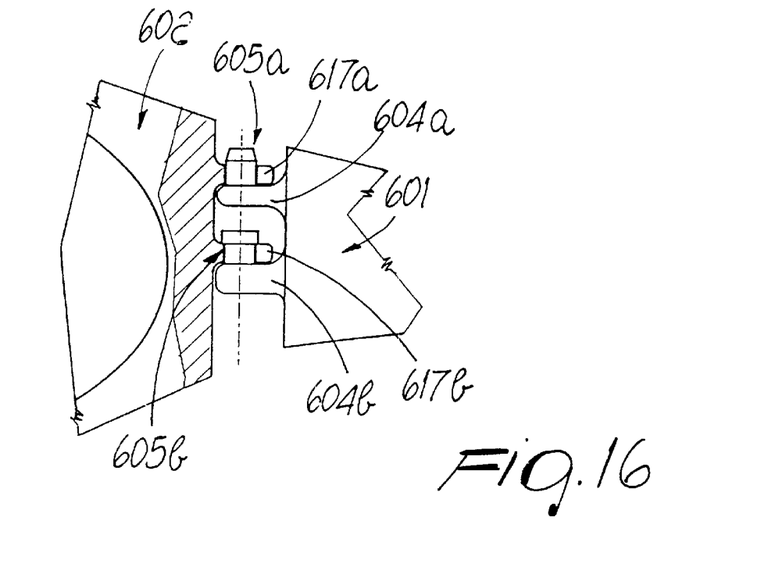

FIGS. 15 and 16 illustrate a seventh embodiment of a hinge for rotatably coupling a first end 603 of a temple 601 and a second lateral end 608 of a front 602.

A first flap 604a and a second flap 604b protrude at right angles to the first end 603; said flaps are arranged on mutually parallel planes, and a first element 605a and a second element 605b are associated with said flaps and are arranged along a same axis that is perpendicular to said first and second flaps 604a and 604b.

The second element 605b is essentially T-shaped, with a cylindrical stem 606a that is associated with an equally cylindrical head 606b.

A third flap 617a and a fourth flap 617b protrude at right angles to the second end 608 and are arranged on mutually parallel planes.

Said third and fourth flaps 617a and 617b have, proximate to their free end, a first seat 614a and a second seat 614b that are constituted by a first hole and a second hole which have the same diameter and are formed along a same axis that lies at right angles to said third and fourth flaps 617a and 617b.

The third and fourth flaps 617a and 617b have, at the free end, an opening that is formed along a longitudinal plane and gives said end a C-like shape that allows elastic deformation for coupling, with or without a snap action, to said first and second elements 605a and 605b.

By arranging the first end 603 adjacent to the second end 608 and by inserting the first element 605a in the first seat 614a, through the opening formed in the free end of the fourth flap 617b, it is possible to mutually position the front 602 and the temple 601, whereas by means of the simultaneous snap insertion of the second element 605b in the second seat 614b the temple 601 can be rotated but not disengaged from the front 602.

This solution, too, allows to achieve the intended aim and objects.

Figure 17:
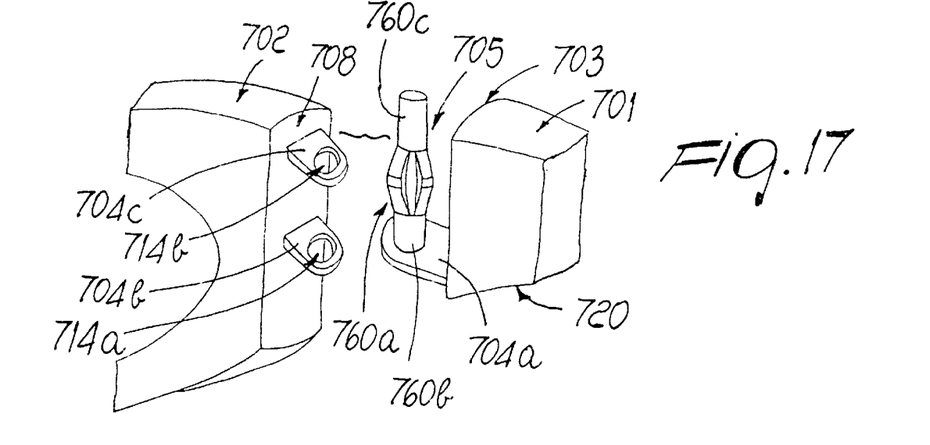
Figure 18:
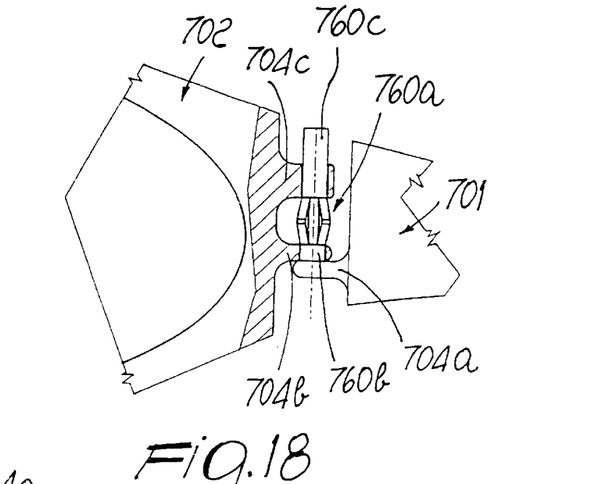

FIGS. 17 and 18 illustrate an eighth embodiment of a hinge for rotatably coupling a first end 703 of a temple 701 and a second lateral end 708 of a front 702.

A first flap 704a protrudes at right angles to the first end 703 and is arranged proximate to the lower perimetric edge 720 of the temple 701.

A substantially cylindrical element 705 protrudes at right angles to the first flap 704a and above it and is constituted by an axially flexible central body 760a, by a first lower body 760b, and by a second upper body 760c.

The central body 760a has two mutually opposite truncated cones whereon a plurality of longitudinal slits are provided which allow said central body 760a to temporarily increase its dimensions in plan view and thus allow the second upper body 760c to move axially.

Two second flaps 704b and 704c protrude at right angles to the second end 708, are arranged on mutually parallel planes, and have a center distance that is approximately equal to the height of the central body 760a.

Proximate to their free end, the two second flaps 704b and 704c respectively have a first seat 714a and a second seat 714b that are constituted by a first hole and by a second hole having the same axis, which is perpendicular to said two second flaps 704b and 704c.

By arranging the first end 703 adjacent to the second end 708 and by inserting the first element 705 in the first seat 714a, it is possible to mutually position the front 702 and the temple 701, whereas by means of the subsequent insertion of the second upper body 760c in the second seat 714b and through the simultaneous snap insertion of the central body 760a between the second flap 704b and the second flap 704c, the temple 701 is allowed to rotate but not to disengage from the front 702.

This solution, too, allows to achieve the intended aim and objects.

In another embodiment, the first element that allows the mutual positioning of the two parts may have, if it preferably has a cylindrical shape, a radial knurling that interacts with a complementarily shaped knurling formed at the first seat, whereat it can be positioned; this allows to achieve, once the parts have been joined, a micrometric rotation, for example of the temple with respect to the front.

As an alternative, said knurling and said complementarily shaped seat can be formed for example at the stem of the second element that allows the mutual temporary rotary coupling of the two parts.

Figure 19:
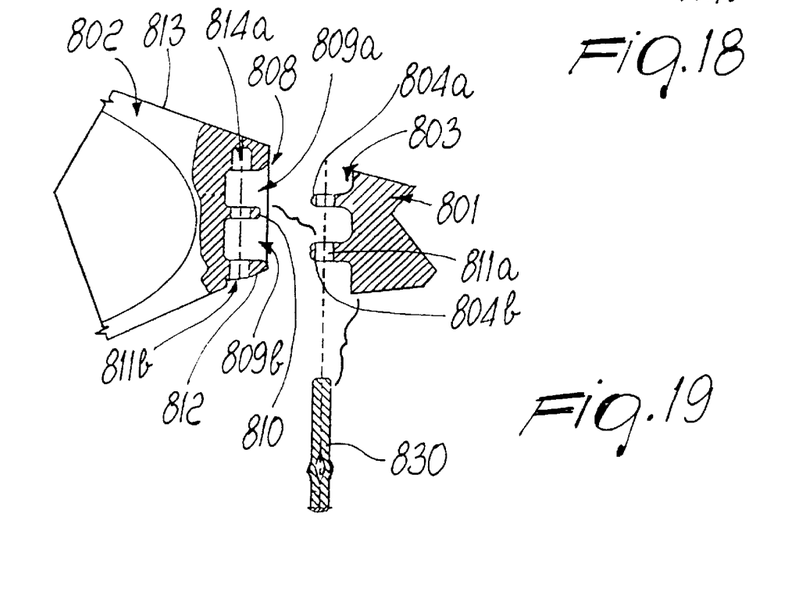
FIGS. 19, 20, and 21 are views of a further embodiment.
Figure 20:
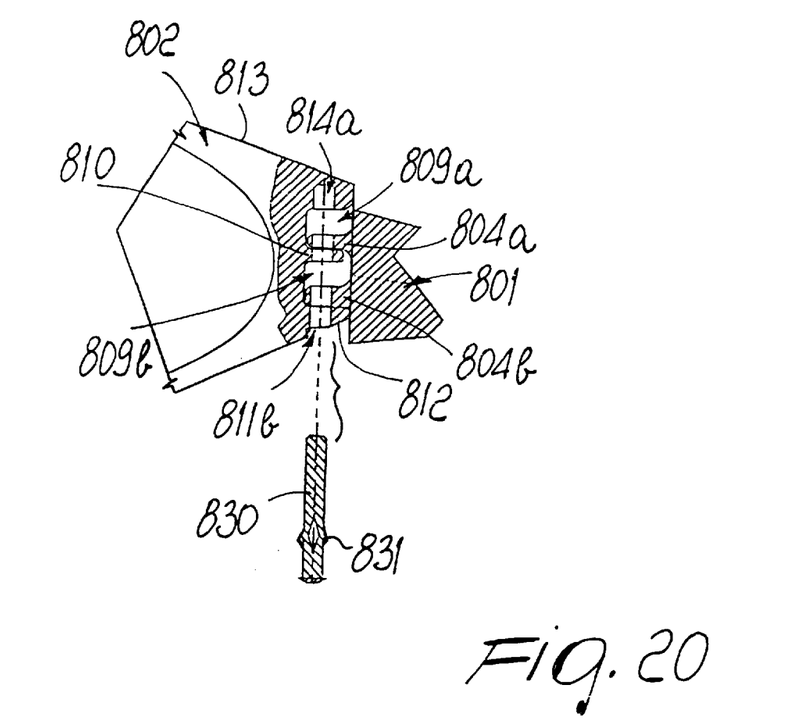
Figure 21:
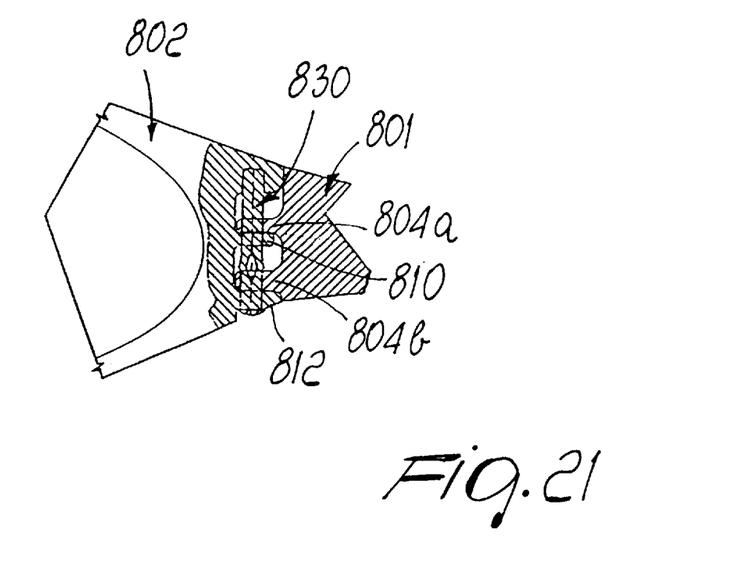

FIGS. 19, 20, and 21 illustrate a further embodiment of a hinge for rotatably coupling a first end 803 of a temple 801 and a second lateral end 808 of a front 802.

A first upper flap 804a and a second lower flap 804b protrude from the first end 803 and are arranged parallel to each other; each flap has a first through hole 811a arranged along a same axis lying at right angles to said flaps.

A first hollow 809a and a second hollow 809b are formed at the second end 808, are mutually identical, are substantially shaped like a parallelepiped, and are formed so as to be mutually adjacent starting from the inner lateral surface of the front 802.

A base 810 is formed between the first and the second hollows, whereas a second hole 811b is formed at the second end 808; starting from the lower perimetric edge 812 of the front 802, said second hole passes through the first hollow 809a, the second hollow 809b, and the base 810 along the same axis as the hole formed on the first and second flaps 804a and 804b once the temple and the front have been mutually associated.

Said hole 811 forms a first seat 814a proximate to the upper perimetric edge 813 of the front 802.

A single element allowing the mutual positioning of the two parts of the pair of eyeglasses and their mutual temporary rotary coupling can be arranged at the first hole 811a and at the second hole 811b; said element is constituted by an essentially cylindrical pivot 830 the diameter whereof approximately matches the diameter of said first and second holes; said pivot has, in an approximately median region, one or more flexible radial flaps 831 which, once they have passed at said hole formed on said base 810, lock above said base.

The materials and the dimensions constituting the individual parts of the device may of course also be the most appropriate according to the specific requirements.

What is claimed is:

1. A hinge for pivotally connecting a first end of a temple to a second end of a front of an eyewear, said hinge comprising:

a) a first upper flap and a second lower flap attached to and extending in spaced, parallel planes from said first end of said temple;

b) a first element attached to said upper flap and a second element attached to said lower flap, said first and second elements extending in coaxial relation to each other and in substantially perpendicular relation to said spaced, parallel planes, wherein said first element extends in a direction away from said lower flap, and said second element extends toward said upper flap;

c) pivotal engagement means provided on said second end of said front for engaging said first and second elements of said temple and thereby establishing said pivotal connection between said temple and said front; and d) one of said first and said second elements including means thereon for cooperative locking engagement with said engagement means on said front, said cooperative locking engagement means being adapted for selective unlocking to permit repeated removal and attachment of said temple from said front.

2. The hinge of claim 1, wherein said first and second elements each comprise a cylindrical stem, said engagement means comprising first and second hollows formed in said second end, said first and second hollows extending into first and second seats wherein said first and second elements are inserted in the engaged condition of said temple and said front, respectively.

3. The hinge of claim 2, wherein said second end of said front includes a base having opposite upper and lower surfaces, said base extending between said first and second hollows, said second seat comprising a through-hole formed in said base.

4. The hinge of claim 3, wherein said cooperative locking engagement means is located on said second element and comprises a frusto-conical head which may be snap-fit through said through-hole in said base with the perimeter of said frusto-conical head lying against said upper-surface of said base in the engaged condition of said front and said temple.

5. The hinge of claim 4 wherein said frusto-conical head is flexible and includes a slit longitudinally extending partially therethrough, said slit forming a longitudinal space in said frusto-conical head in the un-flexed condition, said frusto-conical head being temporarily, flexibly compressible thereby closing said space to permit the withdrawal of said head from said second seat and thereby disengaging said temple from said front.

6. The hinge of claim 1 further comprising:
  a) a middle flap attached to said first end of said temple, said middle flap extending between said first upper flap and said second lower flap in spaced, parallel relation thereto;
  b) a third element attached to said middle flap, said first, second and third elements extending in coaxial relation to each other and in substantially perpendicular relation to said spaced, parallel planes, wherein said first element extends in a direction away from said middle flap, said third element extends in a direction away from said lower flap, and said second element extends toward said middle flap;
  c) said pivotal engagement means provided on said second end of said frame for engaging said first, second and third elements of said temple and thereby establishing said pivotal connection between said temple and said front; and
  d) one of said first, second and third elements including means thereon for cooperative locking engagement with said pivotal engagement means on said front, said cooperative locking engagement means being adapted for selective unlocking to permit repeated removal and attachment of said temple from said front.

7. The hinge of claim 6, wherein said first, second and third elements each comprise a cylindrical stem, said engagement means comprising first, second and third hollows formed in second end, said first, second and third hollows extending into first, second and third seats wherein said first, second and third elements are inserted in the engaged condition of said temple and said front, respectively.

8. The hinge of claim 7, wherein said second end of said front includes an upper base and a lower base, each having opposite upper and lower surfaces, said upper base extending between said first and third hollows, said lower base extending between said third and second hollows, said third seat comprising a through-hole formed in said upper base and said second seat comprising a through-hole formed in said lower base.

9. The hinge of claim 8, wherein said cooperative locking engagement means is located on said second element and comprises a frusto-conical head which may be snap-fit through said through-hole in said lower base with the perimeter of said frusto-conical head lying against said upper surface of said lower base in the engaged condition of said temple and said front.

10. The hinge of claim 9, wherein said frusto-conical head is flexible and includes a slit longitudinally extending partially therethrough, said slit forming a longitudinal space in said frusto-conical head in the un-flexed condition, said frusto-conical head being temporarily, flexibly compressible thereby closing said space to permit the withdrawal of said head from said second seat and thereby disengaging said front from said temple.

11. The hinge of claim 1, wherein said first and second elements each comprise a cylindrical stem, said engagement means comprises:
  a) third and fourth flaps attached to and extending in spaced, parallel planes from said second end of said front, said third and fourth flaps each having opposite upper and lower surfaces;
  b) first and second hollow cylinders attached to said lower surfaces of said third and fourth flaps respectively, said first and second cylinders extending in substantially coaxial relation to each other and in substantially perpendicular relation to said spaced, parallel planes of said third and fourth flaps, wherein said first hollow cylinder extends in a direction toward said lower fourth flap, and said second hollow cylinder extends away from said third flap; said first and second elements being inserted into said first and second hollow cylinders in the engaged condition of said temple and said front, respectively.

12. The hinge of claim 11, wherein said cooperative locking engagement means is located on said first element and comprises a frusto-conical head which may be snap-fit through said first hollow cylinder with the perimeter of said frusto-conical head lying against said upper surface of said third flap in the engaged condition of said temple and said front.

13. The hinge of claim 12, wherein said frusto-conical head is flexible and includes a slit longitudinally extending partially therethrough, said slit forming a longitudinal space in said frusto-conical head in the un-flexed condition, said frusto-conical head being temporarily, flexibly compressible thereby closing said space to permit the withdrawal of said head from said second seat and said temple from said front.

14. A hinge for pivotally connecting a first end of a temple to a second end of a front of an eyewear, said hinge comprising:
  a) a first upper flap and a second lower flap attached to and extending in spaced, parallel planes from said second end of said front;
  b) a first element attached to said upper flap and a second element attached to said lower flap, said first and second elements extending in coaxial relation to each other and in substantially perpendicular relation to said spaced, parallel planes, wherein said first element extends in a direction away from said lower flap, and said second element extends toward said upper flap;

c) pivotal engagement means provided on said first end of said temple for engaging said first and second elements of said front and thereby establishing said pivotal connection between said front and said temple; and d) one of said first and said second elements including means thereon for cooperative locking engagement with said pivotal engagement means on said temple, said cooperative locking engagement means being adapted for selective unlocking to permit repeated removal and attachment of said front from said temple.

15. The hinge of claim 14, wherein said first and second elements each comprise a cylindrical stem, said engagement means comprising first and second hollows formed in said first end of said temple, said first and second hollows extending into first and second seats wherein said first and second elements are inserted in the engaged condition of said front and said temple, respectively.

16. The hinge of claim 15, wherein said first end of said temple includes a base having opposite upper and lower surfaces, said base extending between said first and second hollows, said second seat comprising a through-hole formed in said base.

17. The hinge of claim 16, wherein said cooperative locking engagement means is located on said second element and comprises a frusto-conical head which may be snap-fit through said through-hole in said base with the perimeter of said frusto-conical head lying against said upper surface of said base in the engaged condition of said front and said temple.

18. The hinge of claim 17, wherein said frusto-conical head is flexible and includes a slit longitudinally extending partially therethrough, said slit forming a longitudinal space in said frusto-conical head in the un-flexed condition, said frusto-conical head being temporarily, flexibly compressible thereby closing said space to permit the withdrawal of said head from said second seat and thereby disengaging said front from said temple.

19. A hinge for pivotally connecting a first end of a temple to a second end of a front of an eyewear, said hinge comprising:

a) a first upper flap, a second middle flap and a third lower flap attached to and extending in spaced, parallel planes from said first end of said temple;

b) a first element attached to said second middle flap and extending between said upper flap and said middle flap and a second element attached to said lower flap and extending toward said middle flap, said first and second elements extending in coaxial relation to each other and in substantially perpendicular relation to said spaced, parallel planes;

c) pivotal engagement means provided on said second end of said front for engaging said first and second elements of said temple and thereby establishing said pivotal connection between said temple and said front; and d) one of said first and said second elements including means thereon for cooperative locking engagement with said pivotal engagement means on said front, said cooperative locking engagement means being adapted for selective unlocking to permit repeated removal and attachment of said temple from said front.

20. The hinge of claim 19, wherein said first and second elements each comprise a cylindrical stem, said pivotal engagement means comprising first, second and third hollows extending into first and second seats wherein said first and second elements are inserted in the engaged condition of said temple and said front, respectively.

21. The hinge of claim 20, wherein said second end of said front includes a first base and a second base, each having opposite upper and lower surfaces, said first base extending between said first and second hollows, said first seat comprising an open, u-shaped slot in said first base and wherein said first element is pivotally inserted in the engaged condition of said temple and said front, said second base extending between said second and third hollows, said second seat comprising a through-hole formed in said second base.

22. The hinge of claim 21, wherein said cooperative locking engagement means is located on said second element and comprises a frusto-conical head which may be snap-fit through said through-hole in said second base with the perimeter of said frusto-conical head lying against said upper surface of said second base in the engaged condition of said temple and said front.

23. The hinge of claim 22, wherein said frusto-conical head is flexible and includes a slit longitudinally extending partially therethrough, said slit forming a longitudinal space in said frusto-conical head in the un-flexed condition, said frusto-conical head being temporarily, flexibly compressible thereby closing said space to permit the withdrawal of said head from said second seat and said temple from said front.

24. A hinge for pivotally connecting a first end of a temple to the second end of a front of an eyewear, said hinge comprising:

a) a first flap attached to and extending in a first plane from said first end of said temple;

b) a first element attached to said first flap and extending in substantially perpendicular relation to said first plane;

c) pivotal engagement means provided on said second end of said front for engaging said first element of said temple and thereby establishing said pivotal connection between said temple and said front;

d) said first element including means thereon for cooperative locking engagement with said engagement means on said front, said cooperative locking engagement means being adapted for selective unlocking to permit repeated removal and attachment of said temple from said front.

25. The hinge of claim 24, wherein said first element comprises a hollow cylindrical stem.

26. The hinge of claim 25, wherein said engagement means comprises second and third flaps each having opposite upper and lower surfaces, said flaps each attached to and extending in spaced parallel planes from said second end of said front.

27. The hinge of claim 26, wherein said second flap includes a second cylindrical stem extending substantially perpendicular toward said third flap, said second stem having an outer diameter smaller than the inner diameter of said hollow cylindrical stem of said first element of said first flap, and thereby permitting the sliding, pivotal engagement of said second stem in and out of said hollow stem.

28. The hinge of claim 27, wherein the third flap includes a through-hole aligned in coaxial relation to said second cylinder stem of said second flap and wherethrough said hollow stem extends in the engaged condition of said temple and said front.

29. The hinge of claim 28, wherein said cooperative locking engagement means is located on said first element and comprises a frusto-conical head which may be snap-fit through said through-hole in said third flap with the perimeter of said frusto-conical head lying against said upper surface of said third flap in the engaged condition of said temple and said front.

30. The hinge of claim 29 wherein said frusto-conical head is flexible and includes a slit longitudinally extending partially therethrough, said slit forming a longitudinal space in said frusto-conical head in the unflexed condition, said frusto-conical head being temporarily, flexibly compressible thereby closing said space to permit the insertion of said head through said through-hole in said third flap and said temple from said front.

31. A hinge for pivotally connecting a first end of a temple to the second end of a front of an eyewear, said hinge comprising:
   a) first and second flaps attached to and extending in spaced, parallel planes from said first end of said temple;
   b) first and second elements attached to said first and second flaps respectively, said first and second elements extending in coaxial relation to each other and in substantially perpendicular relation to said spaced, parallel planes, wherein said first element extends in a direction away from said second flap, and said second element extends toward said first flap;
   c) pivotal engagement means provided on said second end of said front for engaging said first and second elements of said temple and thereby establishing said pivotal connection between said temple and said front; and
   d) one of said first and second elements including means thereon for cooperative locking engagement with said engagement means on said front, said cooperative locking engagement means being adapted for selective unlocking to permit repeated removal and attachment of said temple from said front.

32. The hinge of claim 31, wherein said first and second elements each comprise a cylindrical stem.

33. The hinge of claim 32, wherein said engagement means comprises third and fourth flaps, each having opposite upper and lower surfaces and extending in spaced, parallel planes from second end of said front, said third and said fourth flaps each including coaxially aligned openings which each form a c-shaped end portion, said first and second elements being snap-fit into said openings of said third and fourth flaps in the engaged condition of said temple and said front, respectively.

34. The hinge of claim 33, wherein said cooperative locking engagement means is located on said second element and comprises a flattened head, said flattened head having a diameter larger than said second element such that said second element is essentially t-shaped in longitudinal cross-section, said flattened head lying against said upper surface of said fourth flap in the engaged condition of said temple and said front.

35. The hinge of claim 34, wherein said first element includes a beveled head.

36. A hinge for pivotally connecting a first end of a temple to a second end of a front of an eyewear, said hinge comprising:
   a) a first flap attached to and extending in a first plane from said first end of said temple;
   b) an element attached to said first flap, said element extending in substantially perpendicular relation to said first plane;
   c) pivotal engagement means provided on said second end of said front for engaging said element of said temple and thereby establishing said pivotal connection between said temple and said front; and
   d) said element including means thereon for cooperative locking engagement with said engagement means on said front, said cooperative locking engagement means being selectively unlockable to permit repeated removal and attachment of said temple to said front by moving said element along its longitudinal axis.

37. The hinge of claim 36, wherein said element comprises:
   a) a lower cylindrical stem attached to said first flap;
   b) an upper cylindrical stem; and
   c) a radially flexible, central body attached to and extending between said lower and upper stems.

38. The hinge of claim 37, wherein said engagement means comprises second and third flaps attached to and extending in spaced, parallel planes from said second end of said front, said second and third flaps each having opposite upper and lower surfaces.

39. The hinge of claim 38, further comprising first and second through-holes formed in coaxial relation in each of said second and third flaps, wherein said element of said temple is inserted through said first and second through-holes in the engaged condition of said temple and said front, respectively, with said axially flexible central body of said element extending between said second and third flaps, and wherein said axially flexible central body is temporarily radially compressible thereby permitting the withdrawal of said element and said temple from said second and third flaps of said front.

40. A hinge for pivotally connecting a first end of a temple to the second end of a front of an eyewear, said hinge comprising:
   a) first and second flaps attached to and extending in spaced, parallel planes from said first end of said temple, said flaps each having axially aligned thorough-holes;
   b) pivotal engagement means provided on said second end of said front for engaging said first and second flaps of said temple, said engagement means comprising first and second hollows formed in said second end of said front, said first and second hollows each having opposite upper and lower surfaces, said hollows extending into first, second and third seats, said first seat extending into the upper surface of the first hollow, said second seat extending from the upper surface of the second hollow to the lower surface of the first hollow and said third seat extending from the lower surface of the second hollow, said first, second and third seats formed in coaxial relation between each of said first and second hollows; and
   c) an elongated element having first and second opposite ends with a radially flexible portion located approximately midway between said opposite ends, wherein when said through-hole of said first flap, said first seat, said through-hole of said second flap, said second seat and said third seat are coaxially aligned, said element is inserted to permit repeated removal and attachment of said temple to said front by moving said element along said axis establishing said pivotal connection between said temple and said front.

* * * * *